United States Patent [19]

Veijalainen et al.

[11] Patent Number: 5,612,604
[45] Date of Patent: Mar. 18, 1997

[54] METHOD OF MONITORING A TEMPERATURE RISE OF A SQUIRREL CAGE INDUCTION MOTOR

[75] Inventors: Vesa Veijalainen, Espoo; Ilkka Erkkilä, Helsinki; Matti Kauhanen, Espoo, all of Finland

[73] Assignee: ABB Industry Oy, Helsinki, Finland

[21] Appl. No.: 525,560

[22] PCT Filed: Apr. 12, 1994

[86] PCT No.: PCT/FI94/00137

§ 371 Date: Sep. 19, 1995

§ 102(e) Date: Sep. 19, 1995

[87] PCT Pub. No.: WO94/24750

PCT Pub. Date: Oct. 27, 1994

[30] Foreign Application Priority Data

Apr. 14, 1993 [FI] Finland ................. 931674

[51] Int. Cl.⁶ .................................... H02H 6/00
[52] U.S. Cl. ............................... 318/727; 361/24
[58] Field of Search ................. 318/471, 490, 318/634, 641, 727; 388/934; 361/23, 24, 25, 31

[56] References Cited

U.S. PATENT DOCUMENTS 4,547,826  10/1985  Premerlani .
5,539,601   7/1996  Farag .

FOREIGN PATENT DOCUMENTS 0237412  9/1987  European Pat. Off. .
0350507  1/1990  European Pat. Off. .
2151862  7/1985  United Kingdom .

*Primary Examiner*—Bentsu Ro
*Attorney, Agent, or Firm*—Watson Cole Stevens Davis, PLLC

[57] ABSTRACT

The invention relates to a method of monitoring a temperature rise of a stator winding of a squirrel cage induction motor, in which method a stator current I of the motor is measured and the temperature rise of the motor at each moment is determined on the basis of this current I, when a rated temperature rise $\theta_N$ of the motor at a rated current $I_N$, the rated current $I_N$ and a temperature rise time constant $\tau$ of the motor are known. The method comprises steps of determining the stator current I of the motor as discrete moments separated by $\Delta t$ long time periods, determining the temperature rise $\theta_{n(1)}$ of the motor during one time period n from the equation $$\theta_{n(1)} = \frac{I^2}{I_N^2} \theta_N (1 - e^{-\Delta t/\tau})$$

determining a cooling $\theta_{n(2)}$ of the motor during the same time period n from the equation $$\theta_{n(2)} = \theta_{n-1} e^{-\Delta t/\tau},$$

where $\theta_{n-1}$ is the temperature rise of the motor at the end of the preceding time period, and summing the temperature rise $\theta_{n(1)}$ and the cooling $\theta_{n(2)}$ occurred during the same time period to obtain the temperature rise $\theta_N$ of the motor at the end of the time period n.

2 Claims, 2 Drawing Sheets

:::page-number
5,612,604
:::

METHOD OF MONITORING A TEMPERATURE RISE OF A SQUIRREL CAGE INDUCTION MOTOR

SUMMARY OF THE INVENTION

The present invention relates to a method of monitoring a temperature rise of a stator winding of a squirrel cage induction motor supplied by a frequency converter, in which method a stator current I of the motor is measured and the temperature rise of the motor at each moment is determined on the basis of this current I, when a rated temperature rise $\theta_N$ of the motor at a rated current $I_N$, the rated current $I_N$ and a temperature rise time constant $\tau$ of the motor are known, the method comprising steps of determining the stator current I of the motor as discrete moments separated by $\Delta t$ long time periods, determining the temperature rise $\theta_{n(1)}$ of the motor during one time period n from the equation $$\theta_{n(1)} = \frac{I^2}{I_N^2} \theta_N (1 - e^{-\Delta t/\tau})$$

determining a cooling $\theta_{n(2)}$ of the motor during the same time period n from the equation $$\theta_{n(2)} = \theta_{n-1} e^{-\Delta t/\tau},$$

where $\theta_{n-1}$ is the temperature rise of the motor at the end of the preceding time period, and summing the temperature rise $\theta_{n(1)}$ and the cooling $\theta_{n(2)}$ occurred during the same time period to obtain the temperature rise $\theta_N$ of the motor at the end of the time period n.

BACKGROUND OF THE INVENTION (1). Description of the Related Art

Similar methods applicable to monitoring temperature rises, though not for frequency converter supply, are known from GB Patent Application 2151862 and EP Patent Application 350 507, for instance.

(2). Field of the Invention

Electromechanical transmission generates power losses in a squirrel cage induction motor and the losses generated appear as temperature rises of the motor. A magnetizing current to be fed to the motor already causes a temperature rise and upon adding the load the motor warms up more. Part of the heat generated can be caused to flow out of the motor by means of cooling. The outflow of the heat depends on the cooling technique of the motor. The net temperature rise of the motor (temperature rise caused by power losses minus heat outflow) determines the maximum allowed loading capacity. The more the motor is cooled, the more power losses may be allowed for it. The motors are provided with temperature limits, which should not be exceeded. The limits are generally informed both as maximum temperature rise of the insulation of the winding and as maximum temperature rise of the whole motor, whereby the endurance of bearings, for instance, is considered. If the motor exceeds the allowed temperature, the result is either a shortened service life of the motor or, in the worst case, a damaged motor. The limits of the temperature rise of the motor thus restrict the loading capacity. This invention relates to an examination of a temperature rise at the generally most sensible point of the motor, the stator winding. Motor identification plates disclose how much the motor can be loaded by sine wave feed at rated frequency, but the situation becomes more complicated when the supply frequency is changed.

Frequency converter supply causes more power losses in a squirrel cage induction motor than sine wave feed, due to which a motor supplied by frequency converter has a lower loading capacity than a motor having sine wave feed. Additionally, the cooling of the motor causes problems with loading capacity, when a frequency converter is used. The cooling capacity of air-cooled rib-cooled motors changes as a function of frequency, which also causes a change in the maximum loading capacity of the motor as a function of frequency. The maximum loading capacity of especially self-ventilated motors decreases considerably at low speeds when the ventilation capacity is weakening.

Loading capacity is generally informed in relation to rated moment. FIG. 1 of the attached drawing shows a typical moment ratio curve of the loading capacity of a self-ventilated motor when a frequency converter is used, i.e. moment/rated moment in relation to the frequency. The first part (0 . . . 45 Hz) of the curve considers the effect caused by weakening ventilation capacity and the latter part (50 . . . 100 Hz) of the curve considers the effect caused by a field weakening on load moment.

The curve of FIG. 1 is a simplification, which does not illustrate the actual loading capacity accurately. A more accurate idea of the effects of one frequency converter on the loading capacity is obtained from practical measurement results shown in FIG. 2 of the drawing.

When measuring the curve of FIG. 2, the operation of a modulator of the frequency converter used is based on a star modulated PWM (Pulse Width Modulation) technique. The winding behaviour of the loading capacity according to FIG. 2 is caused, except by changes in cooling, by the modulator generating an output voltage.

The loading capacity of the motor is changed at points where modulation is changed, being points at which the number of slices/pulses is changed. The slice number signifies the number of slices during a 60° sector. The number of pulses depends, except on the number of slices, also thereon how many indicators are used per slice.

Object of the Invention

The object of the present invention is to set forth an advantageous and simple thermal model for current, based on a measurement of the motor current and simulating an actual temperature rise- of a stator winding of a squirrel cage induction motor reliably enough, by means of which model the temperature rise of the stator winding of the motor then can be reliably monitored. There are many kinds of protective methods for a squirrel cage induction motor on the market, but there are drives for which no one of the normally used methods is fully suitable. There are drives the motors of which can be reliably protected, but the protective methods are unreasonably expensive, while methods having an advantageous price are unreliable. The reliable methods are generally based on a measurement of motor winding temperatures. One object of this invention is to provide a method of monitoring a temperature rise, which method can be used sensibly also for motors in the protection of which it is not desirable (worth while) to invest much money, but the protective method must nevertheless be moderately reliable. An objective has been set that an equally good technical protection level shall be achieved within the whole supply frequency range of the frequency converter as is achieved at constant frequency by protective relays based on bimetal technique.

When supplying a motor by a frequency converter, the above objects are achieved by means of the method according to the invention, which is characterized in that the method comprises, except for the steps mentioned in the preamble, an additional step of multiplying the temperature rise $\theta_N$ of the motor by a multiplier $K_F$, which is determined from the equation $$K_F = \left[ \frac{1}{Z_{I0} + (Z_{Imi} - Z_{I0}) \times \frac{f_{act}}{f_{mi}} + S_{VP}} \right]^2,$$

where $Z_{I0}$=maximum allowed continuous load current/rated current of the motor at zero frequency, $Z_{Imi}$=maximum allowed continuous load current/rated current of the motor at a frequency $f_{mi}$, $f_{act}$=actual frequency value of the stator current of the motor, $f_{mi}$=frequency of the stator current of the motor, below which frequency the cooling capacity of the motor decreases and $S_{VP}$=constant dependent on slice number/modulation range of the frequency converter, this range corresponding to the actual frequency value $f_{act}$.

Further, for the purpose of considering the different temperature rise time constants of squirrel cage induction motors of different sizes, the method additionally comprises a step of determining the temperature rise time constant $\tau$ of the motor, used for the determination of temperature rise and cooling and corresponding to the actual frequency value $f_{act}$ of the stator current of the motor, from the equation $$\tau = \tau_N \times \frac{k}{1 + (k-1)\left(\frac{f_{act}}{f_N}\right)}$$

$f_N$=rated frequency of the stator current, $\tau_N$=temperature rise time constant at rated frequency and k=constant dependent on motor size.

BRIEF DESCRIPTION OF THE DRAWING

In the following, the method according to the invention and its theoretical background are described in more detail with reference to the attached drawing, in which.

DESCRIPTION OF THE PREFERRED EMBODIMENT

Figure 1:
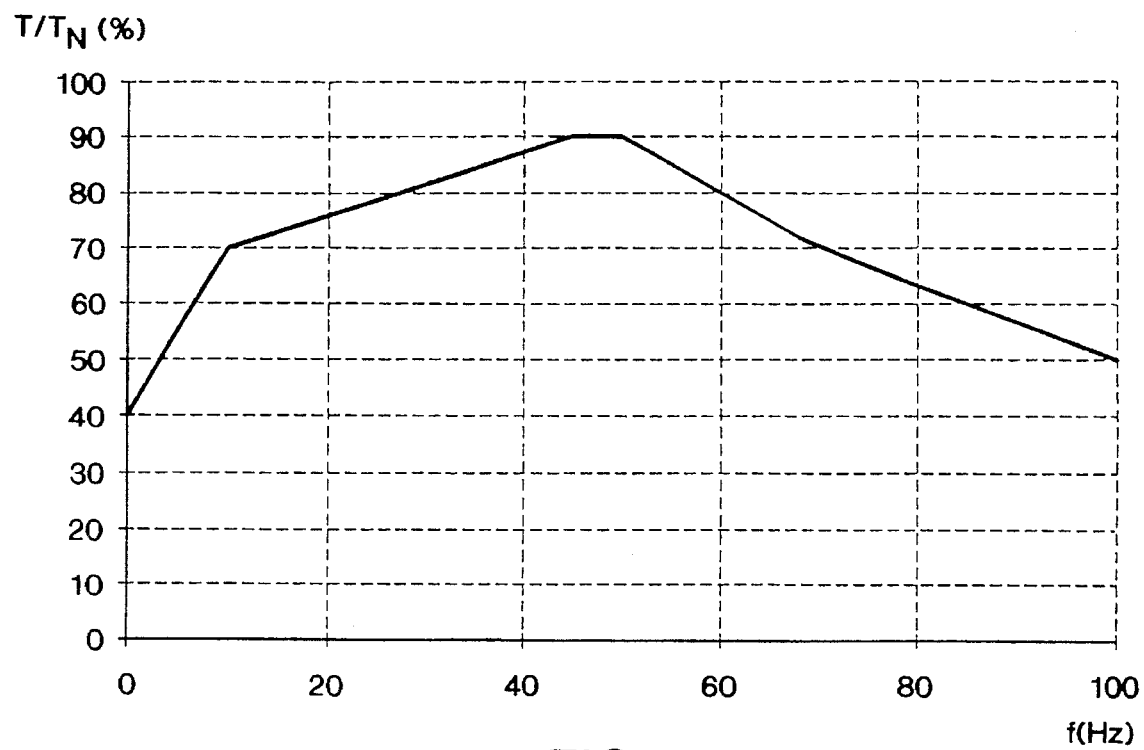
FIG. 1 shows a typical continuous loading capacity curve of a self-ventilated squirrel cage induction motor supplied by a frequency converter.

On the basis of the requirements and objects constituting the starting point of the method according to the invention, an overload protection is implemented by a model calculating the temperature rise by means of mathematical equations. In practice, the calculation is performed by a microprocessor, preferably by a microprocessor of the frequency converter or a drive control system. The method of the invention is based on simple basic equations of temperature rise, the number of input parameters being small and the values of the parameters generally known by the planners. The method of the invention concentrates on protecting the critical part of the motor, the stator winding. The basic starting point is the current to be fed to the motor. As known, the losses and the temperature rise of the motor are proportional to the second power of the current. The basic starting point of the method of the invention is constituted by the basic equations of temperature rise and cooling of a body:

Temperature rise:

$$\theta = \theta_\infty (1 - e^{-t/\tau}) \tag{1}$$

and cooling:

$$\theta = \theta_0 e^{-t/\tau} \tag{2}$$

where $\theta$=temperature rise $\theta_\infty$=temperature rise achieved after an infinite time $\theta_0$=initial temperature rise $\tau$=temperature rise time constant Interest is directed especially to the proportion of the temperature rise to the rated temperature rise $\Theta_N$ of the motor, corresponding to a temperature rise to be obtained at a rated point by a rated load, i.e. a rated current $I_N$. Considering the fact that the temperature rise is proportional to the second power of the load current, the following equations are obtained for the temperature rise and the cooling:

$$\theta = \frac{I_\infty^2}{I_N^2} \theta_N (1 - e^{-t/\tau}), \tag{3}$$

$$\theta = \frac{I_0^2}{I_N^2} \theta_N e^{-t/\tau} \tag{4}$$

The load current going to the motor always warms up the motor, no matter how small it is. The cooling may nevertheless be stronger than the temperature rise caused by the load current, whereby the combined effect is cooling. The motor warms up and cools continuously according to changes in the load current. Consequently, it is not possible to choose only one of the preceding equations 3 and 4. Both of them, cooling and temperature rise, have to be considered continuously. Temperature rise and cooling can be thought to occur as a non-continuous, i.e. discrete process. Accordingly, the temperature rise is divided as per time into successive short parts and each discrete $\Delta t$ long part of time (period) is examined separately. The current acting during this period warms up the motor during the whole period, while the temperature rise occurred before that period and caused by the currents of the preceding periods is cooling during the whole period to be examined. In a way, this corresponds to a real physical situation, in which both temperature rise and cooling take place in the motor all the time.

The temperature rise achieved during one period n (the length of which thus is $\Delta t$) is obtained from equation 3 when time is indicated by Δt, and the cooling occurred during the same period n from the temperature rise of the preceding period n−1 is obtained from equation 4 when time t is indicated by Δt. By combining these two equations, the temperature rise caused by the combined effects thereof is obtained at the end of period n:

$$\theta_n = \theta_{n(1)} + \theta_{n(2)} = \frac{I^2}{I_N^2} \theta_N (1 - e^{-\Delta t/\tau}) + \theta_{n-1} e^{-\Delta t/\tau} \quad (5)$$

Primarily, it depends on the length of the period Δt how big the temperature rise/cooling is during a period at a predetermined current. Secondly, the size of the temperature rise depends on the time during which the final temperature is achieved, i.e. on the temperature rise time constant of the motor. When the temperature rise is calculated at such short, i.e. discrete, time intervals, the actual value of the temperature rise is continuously known. Equation 5 does not consider the effects caused by a frequency converter on the loading capacity, for which reason it is suitable for being used as a thermal model of the stator winding of a motor fed by sine wave.

As mentioned above, the loading capacity of a squirrel cage induction motor supplied by a frequency converter is not constant within the whole frequency range. Especially, as far as self-ventilated squirrel cage induction motors are concerned, the loading capacity decreases abruptly because of weakened cooling capacity at frequencies lower than the rated frequency. In equation 5 is assumed that the rated temperature rise is achieved at the rated current. This is not the case when a frequency converter is used, but the rated temperature rise of the motor is achieved even at the rated frequency at a current lower than the rated current. The changes in the loading capacity caused by frequency converter supply shall be considered in the thermal model of such drives.

It is most preferable to process the changes in the loading capacity as a function of frequency into an equation form, which can be inserted as a coefficient in the thermal model equation 5. The loading capacity of a motor supplied by frequency converter is traditionally presented as a moment ratio according to a curve $Z_T$ of FIG. 3. The moment ratio curve of the loading capacity is there even simpler than the curve of FIG. 1, due to which it suits well for a starting point of a coefficient equation. Magnitude $Z_{TO}$ of the curve $Z_T$ of FIG. 3 is the maximum allowed moment/rated moment at zero frequency in continuous operation that the motor endures thermally, $Z_{Tmt}$ is the maximum allowed moment/rated moment at a threshold frequency $f_{mt}$ in continuous operation that the motor endures thermally, and $f_{mt}$ is the frequency below which the cooling capacity of the motor begins to go down.

Figure 3:
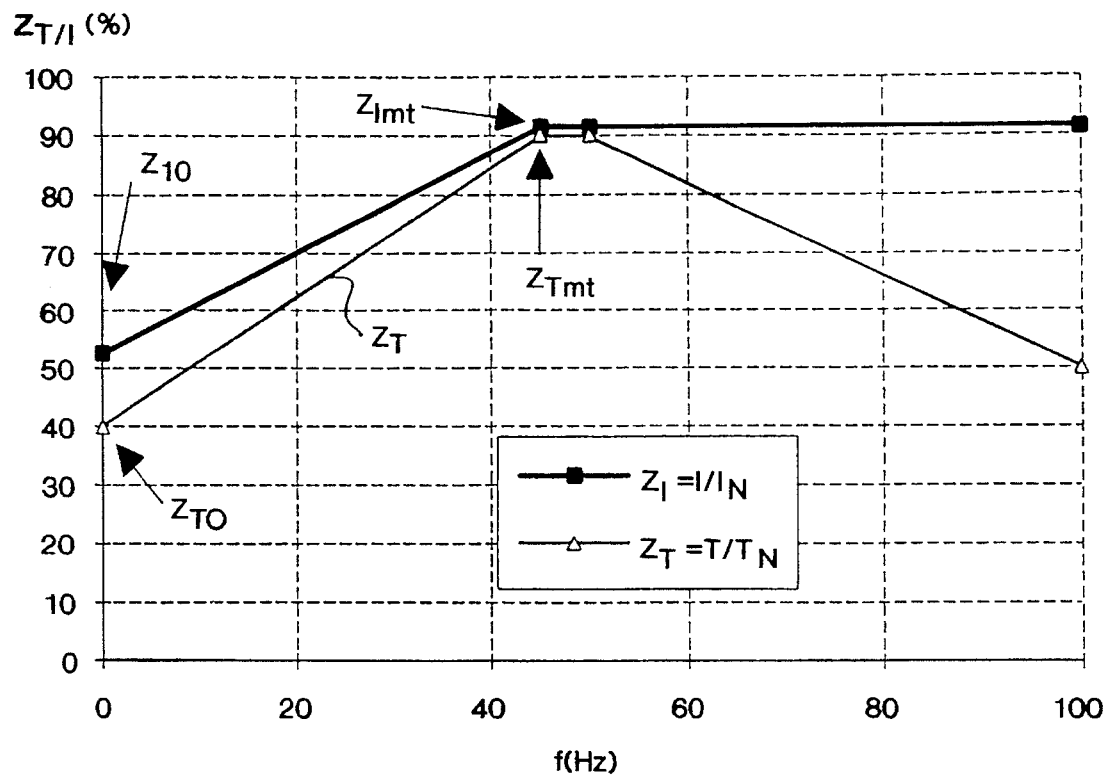
FIG. 3 shows a moment ratio curve of the loading capacity of a squirrel cage induction motor supplied by frequency converter and a current ratio curve formed on the basis thereof.

Curve $Z_T$ of FIG. 3 informs the loading capacity as a moment ratio. However, the thermal model of current utilizes the measurement data of the current, due to which it is important in view of the current model to form a current ratio curve for the maximum allowed continuous loading capacity. Connection between current and moment varies greatly depending on the type of motor. At the same load moment, the currents taken by different motors differ from each other. This is due to the magnetizing current. The higher the pole number of the motor is, the lower is the power factor cosφ and the higher the magnetizing current of the motor. Firstly, the rated current of the motor shall be divided into a magnetizing current component $I_{mN}$ and a current component $I_{qN}$ causing a moment reaction. The division is made by means of equations:

$$I_{mN} = \frac{I_N \times [5 \times (\sin\phi) - 1]}{5 - \sin\phi}, \text{ where} \quad (6)$$

$$\sin\phi = \sqrt{1 - (\cos\phi)^2} \quad (7)$$

$$I_{qN} = \sqrt{I_N^2 - I_{mN}^2} \quad (8)$$

After this, a connection is obtained between the moment curve $Z_T$ and the current curve $Z_I$:

$$Z_I = \frac{1}{I_N} \times \sqrt{(Z_T \times I_{qN})^2 + I_{mN}^2} \quad (9)$$

When the loading capacity decreases, the power factor cosφ decreases as well. A decreasing power factor is due to a decreasing current component causing a moment reaction when the load is decreased. When the moment ratio curve of the loading capacity is changed into a current ratio curve by means of equation 9, the changes in the current component, which influence the very moment, are considered and through this the changes in the power factor. When points of vertical intersection of the moment ratio curve $Z_T$ shown in FIG. 3 are marked in the equation, the respective points of vertical intersection of the current ratio curve can be calculated. The load current curve $Z_I$ provided in this way is also shown in FIG. 3. The points of vertical intersection of the curve are marked therein by indications $Z_{I0}$ and $Z_{Imt}$ corresponding to the points $Z_{T0}$ and $Z_{Tmt}$ of the moment ratio curve. In the case shown in FIG. 3, motor identification plate values are used in equation 9, the values being: $I_N$=242 A, cosφ=0,85. The points of vertical intersection of the moment load curve $Z_T$ are: $Z_{T0}$=40%, $Z_{Tmt}$=90% and $f_{mt}$=45 HZ.

From FIG. 3 is seen that the loading capacity decreases linearly at frequencies lower than the threshold frequency $f_{mt}$, whereby the equation considering the changes in the loading capacity is an equation of a straight line:

$$Z_{Iact} - Z_{I0} = \frac{Z_{Imt} - Z_{I0}}{f_{mt} - 0} (f_{act} - 0) \quad (10)$$

$$\Leftrightarrow$$

$$Z_{Iact} = \frac{f_{act}}{f_{mt}} \times (Z_{Imt} - Z_{I0} + Z_{I0}), \quad (11)$$

where $Z_{Iact}$=maximum allowed continuous load current/rated current of the motor at actual frequency value $f_{act}$, $Z_{I0}$=maximum allowed continuous load current/rated current of the motor at zero frequency, $Z_{Imt}$=maximum allowed continuous load current/rated current of the motor at a frequency $f_{mt}$, $f_{act}$=actual frequency value of the stator current of the motor, $f_{mt}$=stator current frequency of the motor, below which the cooling capacity of the motor decreases.

Figure 2:
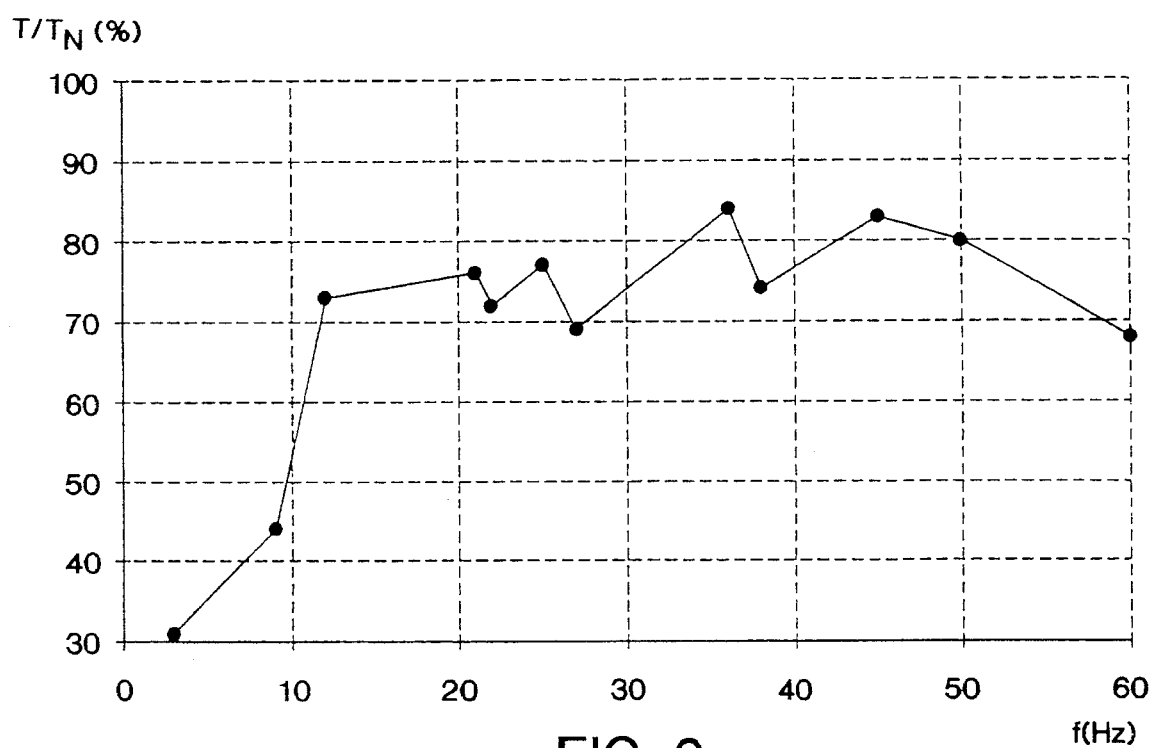
FIG. 2 shows a loading capacity curve of a self-ventilated squirrel cage induction motor based on practical measurements of a frequency converter drive.
Figure 4:
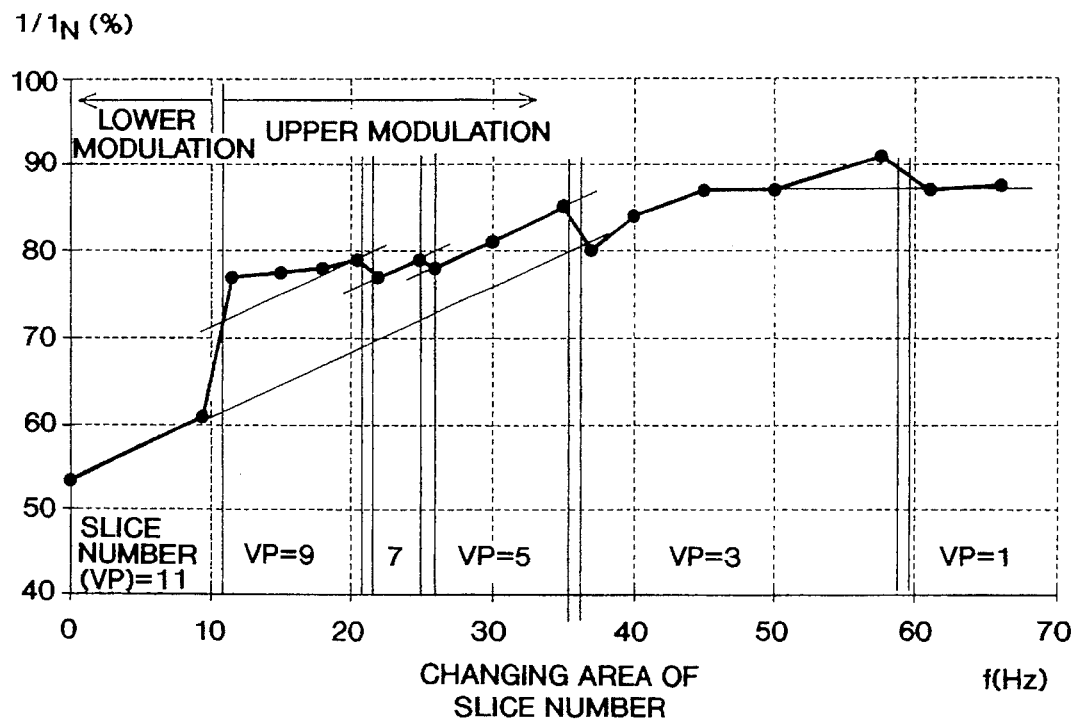
FIG. 4 shows a loading capacity current curve of a self-ventilated squirrel cage induction motor supplied by frequency converter, which curve has been determined by measurements.

FIG. 2 showed that the loading capacity does not depend on the cooling only, but it is also affected by the quality of the voltage supplied by the frequency converter. The curve in FIG. 4 shows how the modulator of the frequency converter influences the loading capacity, which curve is a loading capacity current curve of a self-ventilated squirrel cage induction motor determined by measurements and supplied by frequency converter. A significant change occurs in the loading capacity always at a change of the slice number of the modulator/the pulse number of the voltage. FIG. 4 also shows the basic current curve shown in FIG. 3 and based on equation 11. From FIG. 4 is seen that, within each slice number area, the loading capacity follows the direction of the basic straight line rather accurately, but not the level of the basic straight line. In FIG. 4 are drawn straight lines indicating the loading capacity of each slice number area and being parallel with the above-formed basic straight line of the loading capacity. Accordingly, the actual loading capacity is approached very accurately by making at each slice number area a parallel transmission of the basic straight line solved above, which transmission corresponds to the loading capacity of the area.

From FIG. 4 is seen that the straight line must be lifted only at three slice areas of an upper modulation when the motor flow is kept at the maximum. In the other slice number areas, both in upper and lower modulation, the original straight line illustrates well the loading capacity. The areas marked by dotted lines in the figure represent areas within which the slice number is changed. The change is affected by hysteresis, due to which, when the reference frequency value is increased, the change of slice number occurs at a point slightly different from the respective changing point when the reference frequency value is decreased. However, the frequency converter knows all the time the present slice number/modulation area, due to which the model can choose for its use a parallel transmission of correct size on the basis of this status data. A term $S_{VP}$ causing the parallel transmission is added to equation 11 of the straight line, whereby is obtained:

$$Z_{Iact} = \frac{f_{act}}{f_{mt}} \times (Z_{imt} - Z_{I0}) + Z_{I0} + S_{VP} \quad (12)$$

The equation (12) can be made to the coefficient of the thermal model equation 5 of current by raising it to the second power and by taking an inverse from it:

$$K_F = \left[ \frac{1}{Z_{I0} + (Z_{imt} - Z_{I0}) \times \frac{f_{act}}{f_{mt}} + S_{VP}} \right]^2 \quad (13)$$

In addition to the weakening ventilation capacity of the motor, the coefficient considers the whole decrease of the loading capacity of the motor caused by the use of frequency converter compared to sine wave feed. This coefficient guarantees that the same temperature rise is achieved at all points of the loading capacity current curve as by means of a sine wave fed motor, the load being a hundred per cent. Variables are the points of vertical intersection of the loading capacity curve and the term of the slice number area.

The temperature rise time constant is one basic factor of the thermal model. So it is decisively important for a reliable operation of the model to provide the thermal model with correct time constant. Measurements have shown that the temperature rise time constant of the motor is not constant in the whole frequency range. In the same way as the coefficient equation was made of the changes in the loading capacity for the basic thermal model 5, it is also preferable to make a coefficient equation for the temperature rise time constant changing as a function of frequency.

The temperature rise time constant of a 132 kW motor used for the measurements changes as a function of frequency according to equation 14 in such a way that the time constant is about double the rated temperature rise time constant at zero frequency.

$$\tau = \tau_N \times K_\tau = \tau_N \times \frac{2}{1 + \left( \frac{f_{act}}{f_N} \right)} \quad (14)$$

The time constant of a second measured small (30 kW) squirrel cage induction motor follows equation 15 in such a way that the time constant is about four times the rated temperature rise time constant at zero frequency.

$$\tau = \tau_N \times K_\tau = \tau_N \times \frac{4}{1 + 3\left( \frac{f_{act}}{f_N} \right)} \quad (15)$$

It is thus conceivable that the temperature rise time constant follows the equation $$\tau = \tau_N \times \frac{k}{1 + (k-1)\left( \frac{f_{act}}{f_N} \right)} \quad (16)$$

$f_N$=rated frequency of stator current
$\tau_N$=temperature rise time constant at rated frequency and
k=constant depending on motor size.

On the basis of the above practical measurement results, the size of the constant k is chosen to be for instance 2 or 4 depending on the size category of the motor. If the thermal model is provided with a too low time constant, an error occurs always in a safer direction in view of protection. The model may decouple the drive too quickly. On the other hand, a too high time constant of the thermal model may cause a damage of the motor.

By combining the above calculated coefficients caused by the loading capacity and the temperature rise time constant with the mathematical thermal model of current (equation 5) obtained for sine wave feed, a thermal model equation of current is obtained, which is suitable for frequency converter use:

$$\theta_n = \theta_{n(1)} + \theta_{n(2)} = K_F \frac{I^2}{I_N^2} \theta_N [1 - e^{-\Delta t/(\tau_N K_\tau)}] + \theta_{n-1} e^{-\Delta t/(\tau_N K_\tau)} \quad (17)$$

As appeared earlier, the method of monitoring a temperature rise according to the invention can be arranged either to be calculated by the microprocessor of the frequency converter or by the microprocessor of the drive control system. Only a few parameter data are needed for the use of the method. As parameters are fed identification plate values of the drive and the point of vertical intersection of the loading capacity moment curve.

In direct and group drives, software for the thermal model of current shall be positioned in the frequency converter. A direct drive is a frequency converter drive, which has a separate supply and one converter unit supplying one or several motors. The structure of group and line drives differs from the direct drive, but their basic structure is mutually similar. Inverter units of the drive groups have a common supply unit and a DC bar. The line drives differ from the group drives in such a way that the drive groups and thus also the motors therein are controlled by a common drive control. The control of the whole line drive is attended to by a process computer. Different drive applications also cause differences in the measurement of the motor current required by the model. When the inverter feeds only one squirrel cage induction motor, the separate current measurement system of the inverter can be utilized. In a so-called parallel motor drive, i.e. when more than one parallel-connected motors are fed by inversion, the separate current measurement of the inverter cannot be utilized. Then the current of (at least) one phase of each motor shall be measured by a separate current measurement system.

We claim:

1. A method of monitoring a temperature rise of a stator winding of a squirrel cage induction motor supplied by a frequency converter, in which method a stator current I of the motor is measured and the temperature rise of the motor at each moment is determined on the basis of this current I, when a rated temperature rise $\theta_N$ of the motor at a rated current $I_N$, the rated current $I_N$ and a temperature rise time constant $\tau$ of the motor are known, the method comprising steps of determining the stator current I of the motor as discrete moments separated by $\Delta t$ long time periods, determining a temperature rise $\theta_{n(1)}$ of the motor during one time period n from the equation $$\theta_{n(1)} = \frac{I^2}{I_N^2} \theta_N (1 - e^{-\Delta t/\tau})$$

determining a cooling $\theta_{n(2)}$ of the motor during the same time period n from the equation $$\theta_{n(2)} = \theta_{n-1} e^{-\Delta t/\tau},$$

where $\theta_{n-1}$ is the temperature rise of the motor at the end of the preceding time period, and summing the temperature rise $\theta_{n(1)}$ and the cooling $\theta_{n(2)}$ occurred during the same time period to obtain the temperature rise $\theta_N$ of the motor at the end of the time period n, characterized in that the method additionally comprises a step of multiplying the temperature rise $\theta_N$ by a multiplier $K_F$, which is determined from the equation $$K_F = \left[ \frac{1}{Z_{I0} + (Z_{Imt} - Z_{I0}) \times \frac{f_{act}}{f_{mt}} + S_{VP}} \right]^2,$$

where $Z_{I0}$=maximum allowed continuous load current/rated current of the motor at zero frequency, $Z_{Imt}$=maximum allowed continuous load current/rated current of the motor at a frequency $f_{mt}$, $f_{act}$=actual frequency value of the stator current of the motor, $f_{mt}$=frequency of the stator current of the motor, below which frequency the cooling capacity of the motor decreases and $S_{VP}$=constant dependent on slice number/modulation range of the frequency converter, this range corresponding to the actual frequency value $f_{act}$.

2. A method according to claim 1, characterized in that it additionally comprises a step of determining the temperature rise time constant $\tau$ of the motor, used for the determination of temperature rise and cooling and corresponding to the actual frequency value $f_{act}$ of the stator current of the motor, from the equation $$\tau = \tau_N \times \frac{k}{1 + (k-1)\left(\frac{f_{act}}{f_N}\right)}$$

$f_N$=rated frequency of the stator current, $\tau_N$=temperature rise time constant at rated frequency and k=constant dependent on motor size.

* * * * *